United States Patent [19]

King

[11] 4,399,476
[45] Aug. 16, 1983

[54] SUSPENSION ASSEMBLY FOR MAGNETIC HEAD

[75] Inventor: Francis K. King, San Jose, Calif.

[73] Assignee: Datapoint Corporation, San Antonio, Tex.

[21] Appl. No.: 253,577

[22] Filed: Apr. 13, 1981

[51] Int. Cl.³ .................... G11B 5/48; G11B 21/16; G11B 15/64; G11B 5/60
[52] U.S. Cl. .................................... 360/104; 360/103
[58] Field of Search ............... 360/104, 102, 103, 105, 360/86, 97, 99, 107

[56] References Cited

U.S. PATENT DOCUMENTS

| | | | |
|---|---|---|---|
| 3,051,954 | 8/1962 | Osterlund | 346/74 |
| 4,167,765 | 9/1979 | Watrous | 360/103 |
| 4,268,879 | 5/1981 | Watrous | 360/104 |
| 4,280,156 | 7/1981 | Villette | 360/103 |
| 4,291,350 | 9/1981 | King | 360/104 |
| 4,343,025 | 8/1982 | Kronfeld | 360/104 |

Primary Examiner—Robert M. Kilgore

[57] ABSTRACT

The disclosed suspension assembly (S) for carrying a magnetic recording head in close following relation to a recording disc includes an improved arrangement for supplying a load to the recording head. The suspension assembly (S) includes a flexible gimbal section (10a) for mounting the recording head and accommodating dampened pitch, roll and transverse movements. The head load arrangement comprises a flexible cantilevered spring tongue (10b) and an elongate rigid load member (20) that extends from the free end of the spring tongue to contact the suspension assembly (S) adjacent the recording head. The load member (20) is configured to cause the spring tongue (10b) to resiliently deflect by a predetermined amount, resulting in a predetermined head load being supplied through the load member to the recording head.

9 Claims, 7 Drawing Figures

SUSPENSION ASSEMBLY FOR MAGNETIC HEAD

BACKGROUND OF THE INVENTION

The present invention relates to disc magnetic recording systems, and in particular to suspension systems for carrying a magnetic recording head in close following relation to the surface of a rotating magnetic recording disc.

Data storage and retrieval in disc magnetic recording systems are accomplished through a magnetic recording head suspended in close following relation to the surface of a rotating magnetic recording disc. The recording head is essentially a transducer assembly that, in a storage mode, is used to write digital information in the form of encoded magnetic flux transitions on the surface of a recording disc, or, in a retrieval mode, is used to read the recorded flux transitions to recover the information. The recording head may be fixed over a particular one of the concentric recording tracks on the recording disc (the "fixed head" system), or may be translatable from track to track (the "head protract" system).

In most current systems, the recording head(s) is(are) not normally retracted from the disc surface. That is, prior to start-up, a recording head is in physical contact with a stationary disc surface; as the disc commences rotation during start-up the recording head "takes-off" from the disc surface, thereafter flying at a predetermned flying height, typically on the order of tens of microinches. When the system is shutdown, the recording head again "lands" on the disc surface as the disc ceases rotating.

Current recording heads are designed not only for their transducer (input/output) characteristics, but also for their aerodynamic properties. Head bearing elements define air bearing surfaces which are aerodynamically designed to provide the lift and stability necessary for the recording head to fly over the disc surface. Since the transducer characteristics of a recording head depend, in part, upon its flying height, careful attention is paid to the two design factors that determine flying height: (a) the configuration and total surface of the air bearing surfaces, and (b) the load supplied to the recording head.

The load on a recording head is supplied by the head suspension assembly. Thus, the suspension assembly performs two important functions: (a) carrying the recording head in close following relation to the disc surface, and (b) supplying a constant magnitude load to the recording head to maintain a predetermined flying height. Additionally, the suspension assembly must permit the recording head some degree of pitch, roll and transverse (i.e., perpendicular to the disc surface) movement to accommodate unavoidable aerodynamic instabilities, while at the same time counteracting or dampening these motions to reduce the liklihood of head-disc dynamic contact (head crash).

Head suspension assemblies commonly use a gimbal mounting arrangement to accommodate pitch, roll and transverse head movements. To provide the necessary load force on the recording head, one common technique is to incorporate into the suspension assembly a thin flange or tongue of stainless steel that functions essentially as a load spring. The load tongue is bent by a precisely controlled amount and then heated; when the load tongue cools it retains its bent configuration, establishing the loading (i.e., spring force) that the suspension assembly will provide. Head load is supplied to a recording head mounted to the suspension assembly by counter-deflecting the load tongue and attaching a substantially straight, cantilevered head contact arm such that the free end of the contact arm contacts the suspension assembly adjacent the recording head. During operation, the contact arm maintains the counter-deflection of the load tongue and transmits the resulting load to the recording head.

The above technique for supplying a load to a recording head is disadvantageous. As noted previously, to accurately maintain a predetermined flying height, the head load magnitude must be precisely controlled. Accordingly, the heat-relax bending of the load tongue must be performed within narrow tolerances. Such tolerances have proved difficult to achieve; often the load tongue bending must be adjusted after the recording head is mounted to the suspension assembly, causing production delays and increased production costs.

A general object of the present invention is to provide an improved suspension assembly for carrying a magnetic recording head, and supplying a predetermined head load. A specific object is to provide a suspension assembly incorporating an head loading arrangement that can be accurately, reliably and economically fabricated and assembled such that head load magnitude can be established without post-assembly adjustment.

SUMMARY OF THE INVENTION

Briefly, to achieve these objects and others that will be apparent to those of ordinary skill in the art, the suspension assembly of the present invention includes a gimbal arrangement for mounting a recording head and a head load arrangement for supplying a load to the recording head. The gimbal arrangement is attached to the end of a rigid suspension arm; it permits dampened pitch, roll and transverse movements of the recording head. The head load arrangement includes a flexible, cantilevered spring tongue extending from the end of the suspension arm, and an elongate cantilevered load member affixed to and extending from the free end of the spring tongue to contact the suspension assembly adjacent the recording head. The load member is configured to cause the spring tongue to resiliently deflect by a predetermined amount, resulting in a predetermined head load being applied to the recording head.

For a preferred embodiment, the gimbal arrangement and the spring tongue extend from a mounting section, forming a unitary, flat suspension framework that is affixed to the suspension arm by means of the mounting section. The load member includes an elongate load arm that is bent to a predetermined configuration. When the load arm is engaged, the bend configuration of the load arm causes the spring tongue to resiliently deflect by a predetermined amount calculated to provide the necessary head load.

BRIEF DESCRIPTION OF THE DRAWINGS

A more complete understanding of the present invention can be had by reference to the following detailed description of a preferred embodiment when considered in conjunction with the accompanying drawings, in which.

PREFERRED EMBODIMENT

Figure 1:
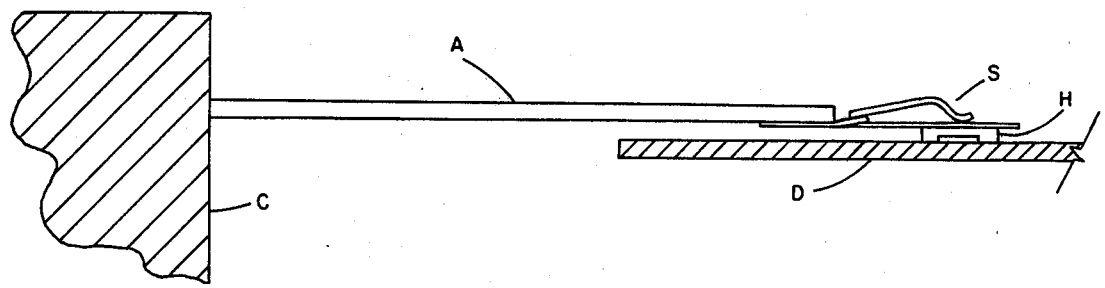
FIG. 1 is a schematic view of the suspension assembly with a recording head mounted to it, showing the suspension assembly affixed to a rigid suspension arm which is attached to a carriage structure.

In the schematic in FIG. 1, a portion of a magnetic recording disc is shown at D; during operation the recording disc is rapidly rotated by means not shown. A suspension assembly S carries a recording head H in close following relation to the recording disc surface, in position to write or read digital information in the form of magnetic flux transitions. The specific configuration for the recording head H forms no part of the present invention and, therefore, is not discussed in detail. The suspension assembly of the present invention is readily adaptable to any recording head configuration, accommodating dynamic pitch, roll and transverse motions and supplying the optimum head load for a specified flying height.

Suspension assembly S is mounted to a rigid suspension arm A, which in turn is attached to a carriage C. The suspension assembly of the present invention is readily adaptable to any of the track-accessing techniques used in current disc magnetic recording systems; in a fixed-head system, carriage C would be stationary while, alternatively, carriage C may form part of a head-protract servo system that translates the recording head radially to access any of the concentric disc recording tracks. Furthermore, a cam loading mechanism (not shown) may be provided to raise suspension arm A and retract recording head H and suspension assembly S from the disc surface.

Figure 2A:
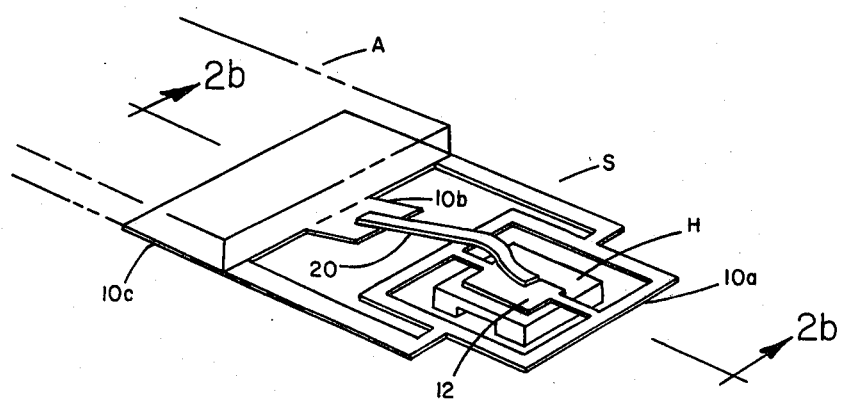
FIG. 2a is an isometric view and FIG. 2b is an elevation view of the suspension assembly together with a mounted recording head.
Figure 2B:
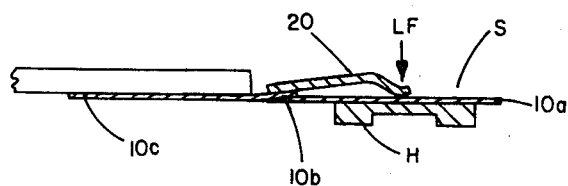

Referring to FIGS. 2a and 2b, suspension assembly S includes a gimbal section 10a, a spring tongue 10b, a load member 20 and a mounting section 10c. Gimbal section 10a and spring tongue 10b extend from mounting section 10c, which mounts suspension assembly S to suspension arm A (dotted outline). Gimbal section 10a provides a gimbal arrangement for coupling a head pad 12, to which recording head H is affixed, to mounting section 10c. Cantilevered load member 20 extends from the free end of spring tongue 20 to contact at its distal end head load pad 12.

Figure 3A:
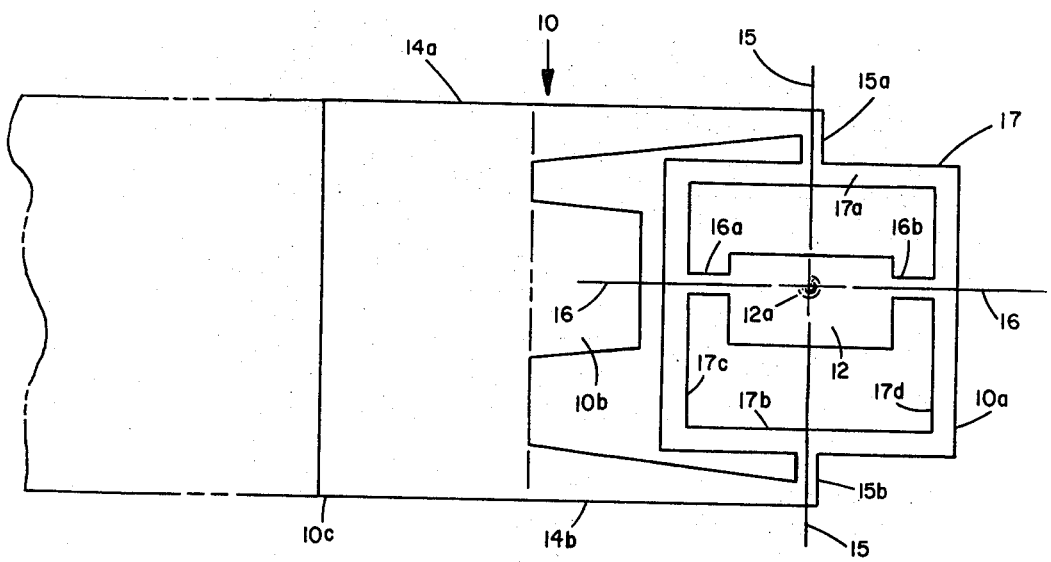
FIG. 3a is a plan view and FIG. 3b is an elevation view of the suspension framework, i.e., the gimbal section, the spring tongue and the mounting section.
Figure 3B:
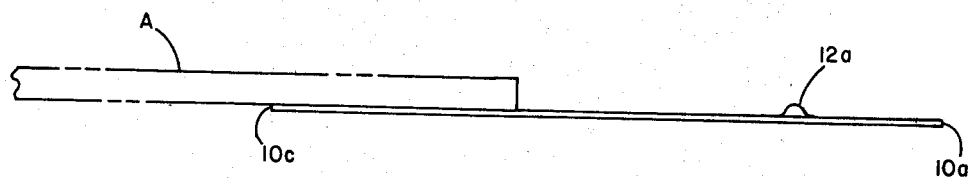

Referring to FIGS. 3a and 3b, gimbal section 10a, spring tongue 10b and mounting section 10c together form a unitary suspension framework 10. Preferably, suspension framework 10 is formed by a chemical etching process from a thin, planar sheet of metal. No further operations are required to form the suspension framework; in particular, no additional bending operation is required for spring tongue 10b. As described below, spring tongue 10b functions solely as a deflection spring for developing a head load force, it is not bent or otherwise formed to establish the magnitude of the load.

Gimbal section 10a couples head pad 12 to mounting section 10c such that an attached recording head is permitted dynamic pitch, roll and transverse movements during flight such movements being resiliently dampened to enhance aerodynamic stability.

Gimbal section 10a includes transverse arms 14a and 14b to accommodate transverse movements of the recording head, roll arms 15a and 15b to accommodate roll movements, and pitch arms 16a and 16b to accommodate pitch movements. The cantilevered transverse arms 14a and 14b extend in spaced parallel relation from opposite ends of mounting section 10c. Roll arms 15a and 15b extend perpendicularly inwardly from the distal ends of, respectively, transverse arms 14a and 14b, and are colinear with the roll axis 15 of gimbal section 10a. Roll arms 15a and 15b intersect, respectively, opposite legs 17a and 17b of a square-shaped ring 17, such that the ring is symmetrical about roll axis 15. Pitch arms 16a and 16b are connected between head pad 12 and, respectively, opposite legs 17c and 17d of ring 17, and are colinear with the pitch axis 16 of gimbal section 10a.

Gimbal section 10a provides an effective gimbal arrangement for accommodating transverse, pitch and roll movements of a recording head mounted to head pad 12. Transverse arms 14a and 14b resiliently deflect upwardly in response to transverse movements of the recording head, dampening such transverse movements. Roll arms 15a and 15b torsionally rotate about gimbal roll axis 15 in response to recording head roll movements, while pitch arms 16a and 16b torsionally rotate about gimbal pitch axis 16 in response to pitch movements, the torsional action of the roll and pitch arms operating to dampen these movements.

Head pad 12 includes a dome-shaped, universal knob 12a that protrudes above the planar surface of the head pad (see FIG. 3b). As described below, universal knob 12a is the contact point for load member 20 which, together with spring tongue 10b, supplies a substantially vertical load force to the recording head mounted to head pad 12. Universal knob 12a is positioned on head pad 12 such that the head load is applied at the intersection of the pitch and roll axes of gimbal section 10a and, therefore, of the recording head.

Suspension assemblies have been fabricated according to the present invention in which a batch (typically 100) of suspension frameworks 10 were chemically etched from a sheet of stainless steel two mils (0.002 inches or approximately 0.05 mm) thick. After chemical etching, the universal knobs were formed in a tool press operation. Stainless steel was chosen because of its relatively high value of Young's modulus and, therefore, the relatively large amount of restorative (i.e., dampening) force developed by torsional and bending deflections. Each suspension framework was 540 mils (approximately 13.5 mm) by 850 mils (approximately 21 mm) overall, with mounting section 10c being 540 mils by 275 mils (approximately 7 mm), the connecting arms 14a and 14b being 375 mils (approximately 9 mm) long, gimbal ring 17 being 400 mils (approximately 10 mm) on a side, head pad 12 being 270 mils (approximately 7 mm) by 116 mils (approximately 3 mm), and spring tongue 10b being 180 mils (approximately 4.5 mm) wide by 150 mils (approximately 4 mm) long.

The actual dimensions for suspension framework 10 are not critical. The framework should be thin enough for adequate bending or torsional deflection of transverse arms 14 and 14b, roll arms 15a and 15b, and pitch arms 16a and 16b. Also, the configuration of the gimbal arrangement provided by transverse arms 14a and 14b, roll arms 15a and 15b, the ring 17 and pitch arms 16a and 16b is not critical; other gimbal configurations could be used for the suspension assembly of the present invention. Finally, while the precise configuration of spring tongue 10b is not critical, once the thickness of suspension framework 10b is chosen, the spring tongue area and, in particular, the spring tongue length determine the deflection force obtainable from the spring tongue. That is, the configuration of the spring tongue determines the amount by which it must be deflected to obtain a given amount of deflection force (i.e., a given amount of head load).

Figure 4A:
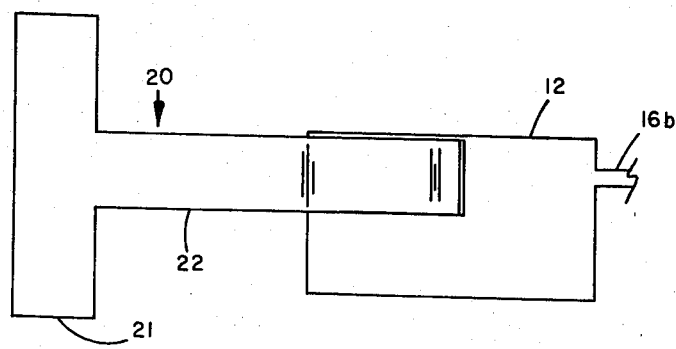
FIG. 4a is a plan detail view and FIG. 4b is an elevation detail view of the load member of the present invention.
Figure 4B:
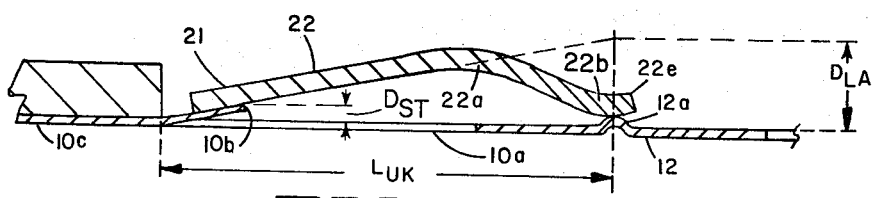

The actual deflection of spring tongue 10b and, therefore, the head load magnitude, is established by the configuration of load member 20, which is shown in detail in FIGS. 4a and 4b. Load member 20 includes a mounting bar 21 and a load arm 22 which extends perpendicularly from the center of the mounting bar. Mounting bar 21 is affixed, such as by welding, to the free end of spring tongue 10b. Cantilevered load arm 22 extends from the free end of spring tongue 10b to contact at its distal end 22e universal knob 12a (FIG. 4b).

Load arm 22 is configured by two distinct bends. The first bend is located intermediate the ends of load arm 22 at 22a such that, with end 22e in contact with universal knob 12a, spring tongue 10b is deflected out of the plane of the suspension framework 10, causing a deflection force. The second bend is located adjacent load arm end 22e at 22b, and is counter to the intermediate bend (22a) such that end 22e contacts universal knob 12a at approximately its apex. Load arm end 22e and universal knob 12a thus form a point-contact universal joint through which the head load is applied substantially vertically to the universal knob and, thence, to a recording head attached to head pad 12, with the universal joint permitting transverse, pitch and roll movements of the recording head.

As noted previously, the amount of deflection of spring tongue 10b and, therefore, the magnitude of the head load is established by the configuration of load arm 22. The precise amount of load arm bending needed to provide a given deflection of spring tongue 10b is determined through beam analysis. Specifically, for a given deflection force (i.e., head load), the vertical deflection $D_{ST}$ at the free end of spring tongue 10b is given by the following equation:

$$D_{ST} = \frac{PL^3}{3EI} \quad (1)$$

where
P is the predetermined head load;
L is the spring tongue length;
E is Young's Modulus for the spring tongue material; and
I is the area moment for the spring tongue.
The area moment is given by the equation:

$$I = \frac{WH^3}{12} \quad (2)$$

where
W is the width and
H is the thickness of spring tongue 10b.
Combining equations (1) and (2) yields:

$$D_{ST} = \frac{P^{(4)}}{E} \cdot \frac{L}{WH^3} \quad (3)$$

Thus, once the configuration (i.e., the length, width and thickness) of spring tongue 10b is set, the required deflection $D_{ST}$ for the spring tongue is directly proportional to the predetermined head load P.

Referring to FIG. 4b, a deflection $D_{ST}$ of spring tongue 10b corresponds to a deflection $D_{LA}$ at universal knob 12a. The required deflection $D_{LA}$ that must be provided by load arm 22 is given by the following geometrical expression:

$$D_{LA} = L_{UK} \frac{D_{ST}}{\sqrt{L^2 - D_{ST}^2}} \quad (4)$$

where
L is the length of spring tongue 10b and
$L_{UK}$ is the distance from the end of suspension arm A to universal knob 12a.

Thus, load arm 22 is configured by intermediate bend 22a and distal bend 22b to provide the required deflection $D_{LA}$, the length of the load arm being chosen such that, after bending, load arm end 22e contacts universal knob 12a.

Controlling the amount of head load through the design of load arm 22 has three principal advantages over the prior art heat-relax bending technique. First, since load arm 22 can be deflected during fabrication to within the necessary tolerance more reliably than the spring tongue can be deflected in a head-reflax bending operation, the need for post-assembly adjustment of the suspension assembly is substantially eliminated. Second, the tolerance requirements for deflecting load beam 22 are less than the tolerance requirements for deflecting spring tongue 10b because a given discrepancy in the spring tongue deflection $D_{ST}$ has a significantly greater effect on the head load than does the same discrepancy in the load arm deflection $D_{LA}$. For example, suspension assemblies according to the present invention have been fabricated in which a tolerance in the range of 4 mils for $D_{ST}$ permitted a tolerance in the range of 12 mils for $D_{LA}$. Finally, production costs are lowered because the suspension assembly head load can be established by performing a low-cost stamping operation on load member 20, eliminating the relatively more expensive heat-relax bending operation on spring tongue 10b.

Suspension assemblies have been fabricated according to the present invention that included load members 20 which were stamped from a sheet of stainless steel 25 mils (approximately 0.62 mm) thick, with the stamping operation both cutting out and configuring the load member. The configuration of the load member was established to provide a deflection $D_{LA}$ of 67 mils with a tolerance of 12 mils (plus or minus), corresponding to a spring tongue deflection $D_{ST}$ of 22 mils plus or minus 4 mils. While other materials could be used for load member 20, stainless steel was chosen to facilitate attachment by welding to the preferred stainless steel spring tongue 10b.

Referring to FIGS. 2a and 2b, the assembly and operation of the suspension assembly will now be described. Mounting section 10c of suspension framework 10 is welded or epoxy bonded to suspension arm A such that connecting arms 14a and 14b and spring tongue 10b extend cantilevered beyond the edge of the suspension arm. At this stage, suspension framework 10 is substantially planar (except for the protruding universal knob 12a).

Next, mounting bar 21 of load member 20 is affixed, such as by welding, to the free end of spring tongue 10b such that the pre-configured cantilevered load arm 22 extends over gimbal section 10a with its end 22e contacting the apex of universal knob 12a (FIG. 2b).

The recording head H is then attached, such as by epoxy bonding, to head pad 12 of gimbal section 10a. When load arm end 22e is engaged in contact with universal knob 12a on head pad 12, load arm 22 causes spring tongue 10b to resiliently deflect; the resulting deflection (or load) force (indicated by the vector LF) provided by the spring tongue is transmitted through the load arm to universal knob 12a, and thence to the recording head H. When the recording head H is disposed in recording position over a disc, the head load force LF does not deflect the recording head or any portion of the suspension assembly, it only urges the recording head against the disc surface. In operation, when the disc is rotating, the recording head H flies over the disc, maintained at the predetermined flying height (typically tens of microinches or less) by the head load provided by spring tongue 10b and load member 20.

Suspension assemblies have been fabricated according to the present invention in which load arm 22 was configured to provide a deflection $D_{LA}$ of 67 mils corresponding to a spring tongue deflection $D_{ST}$ of 22 mils, producing a load force LF of between 4 and 5 grams. Of course, load member 22 can be selectively configured to provide greater or lesser load magnitude.

While the invention has therefore been described with respect to a preferred embodiment, those skilled in the art will understand that the invention is not limited thereto, but rather that the limits of the invention to be interpreted only in conjunction with the appended claims.

The embodiments of the invention in which an exclusive property or priviledge is claimed are:

1. A suspension assembly for carrying a magnetic recording head in close following relation to the surface of a moving recording media, said suspension assembly comprising:
    (a) a rigid suspension arm;
    (b) gimbal mounting means attached to said suspension arm for engaging the recording head such that the recording head is permitted resilient transverse, pitch, and roll movements;
    (c) a flexible, substantially flat, cantilevered spring tongue attached to and extending from said suspension arm; and
    (d) a rigid load arm attached at one end to the free end of said spring tongue, the distal end of said load arm contacting said gimbal mounting means adjacent the recording head;
    (e) said load arm being configured such that said spring tongue is caused to resiliently deflect by a predetermined amount resulting in a load force being transmitted through said load arm to the recording head, thereby urging the recording head toward the recording media such that the recording head is spaced from the recording media by a predetermined flying height with the magnitude of the load force and, therefore, the predetermined flying height being established by the configuration of said load arm.

2. The suspension assembly defined in claim 1 wherein said gimbal mounting means includes:
    (a) a head pad adapted to engage the recording head;
    (b) a rounded protuberance extending from said head pad opposite the recording head, said protuberance being disposed at a point corresponding to the intersection of the pitch and roll axes of said gimbal mounting means;
    (c) said load arm contacting said protuberance to form a universal joint for facilitating the pitch and roll movements of the recording head.

3. The suspension assembly defined in claim 2 wherein said protuberance is formed by providing a dimple in said head pad.

4. The suspension assembly defined in claim 2 wherein said gimbal means comprises:
    (a) first and second resilient, cantilevered transverse arms which extend in spaced parallel relation from said rigid suspension arm;
    (b) a substantially square annular frame disposed between the distal ends of said transverse arms, said square frame being defined by first and third spaced parallel opposite legs and second and fourth spaced parallel opposite legs;
    (c) first and second roll arms extending between (i) the distal ends of, respectively, said first and second transverse arms, and (ii), respectively, the first and third opposite legs of said square frame, said roll arms being colinear with the roll axis of said gimbal mounting means;
    (d) first and second pitch arms extending between (i), respectively, the second and fourth opposite legs of said square frame, and (ii) said head pad, said pitch arms being colinear with the pitch axis of said gimbal mounting means;
    (e) said transverse arm permitting resilient transverse movements of the recording head, and said roll arms and pitch arms permitting, respectively, resilient roll and pitch movements of the recording head.

5. The suspension assembly defined in claim 4 wherein said gimbal mounting means, said spring tongue and a mounting section form a unitary, substantially flat suspension framework with said transverse arms and said spring tongue extending from said mounting section such that when said mounting section is affixed to said suspension arm, said transverse arms and said spring tongue extend cantilevered from said suspension arm with said spring tongue being disposed intermediate said transverse arms.

6. The suspension assembly defined in claim 5 wherein said load arm is configured by a first bend intermediate its ends and a second counter-bend adjacent its distal end such that the distal end portion of said load arm contacts said protuberance at substantially its apex.

7. The suspension assembly defined in claim 6 wherein said suspension framework is formed by a chemical etch process.

8. The suspension assembly defined in claim 7 wherein said load arm is formed and configured by a single stamping operation.

9. The suspension assembly defined in claim 8 wherein said suspension framework and said load arm are formed from stainless steel.

* * * * *